United States Patent [19]
Suzuki

[11] Patent Number: 5,339,183
[45] Date of Patent: Aug. 16, 1994

[54] OPTICAL SIGNAL TRANSMISSION DEVICE

[75] Inventor: Katsuo Suzuki, Kawasaki, Japan

[73] Assignee: Fujitsu Limited, Kawasaki, Japan

[21] Appl. No.: 33,617

[22] Filed: Mar. 19, 1993

[30] Foreign Application Priority Data

Mar. 19, 1992 [JP] Japan .................. 4-064052

[51] Int. Cl.$^5$ .................. H04J 4/00; H04J 14/02
[52] U.S. Cl. .................. 359/123; 359/128; 359/133; 359/140; 359/181
[58] Field of Search .................. 359/123, 126, 128, 133, 359/139, 140, 164, 173, 181, 188

[56] References Cited

U.S. PATENT DOCUMENTS

| | | | |
|---|---|---|---|
| 4,467,468 | 8/1984 | Miller | 359/123 |
| 4,809,256 | 2/1989 | Smith et al. | 370/4 |
| 4,829,300 | 5/1989 | Hooper | 341/102 |
| 4,882,775 | 11/1989 | Coleman | 359/181 |
| 5,184,243 | 2/1993 | Henmi et al. | 359/181 |

FOREIGN PATENT DOCUMENTS 0605343 9/1986 PCT Int'l Appl. .

Primary Examiner—Richard E. Chilcot, Jr.
Assistant Examiner—Kinfe-Michael Negash

[57] ABSTRACT

An optical signal transmission device which includes a number of laser diodes each having a different oscillating wavelength and a number of exclusive external modulators are provided based on the number of laser diodes for receiving corresponding outputs of the respective laser diodes and modulating output lights of the laser diodes by separate electrical signals. Also included is an optical coupler device for coupling the optical signal outputs of the external modulators therebetween and an optical amplifying unit for amplifying the output of optical signals of the optical coupler device. The modulated optical outputs of the external modulators are delivered to an optical fiber transmission line in a time-series-mode.

3 Claims, 10 Drawing Sheets

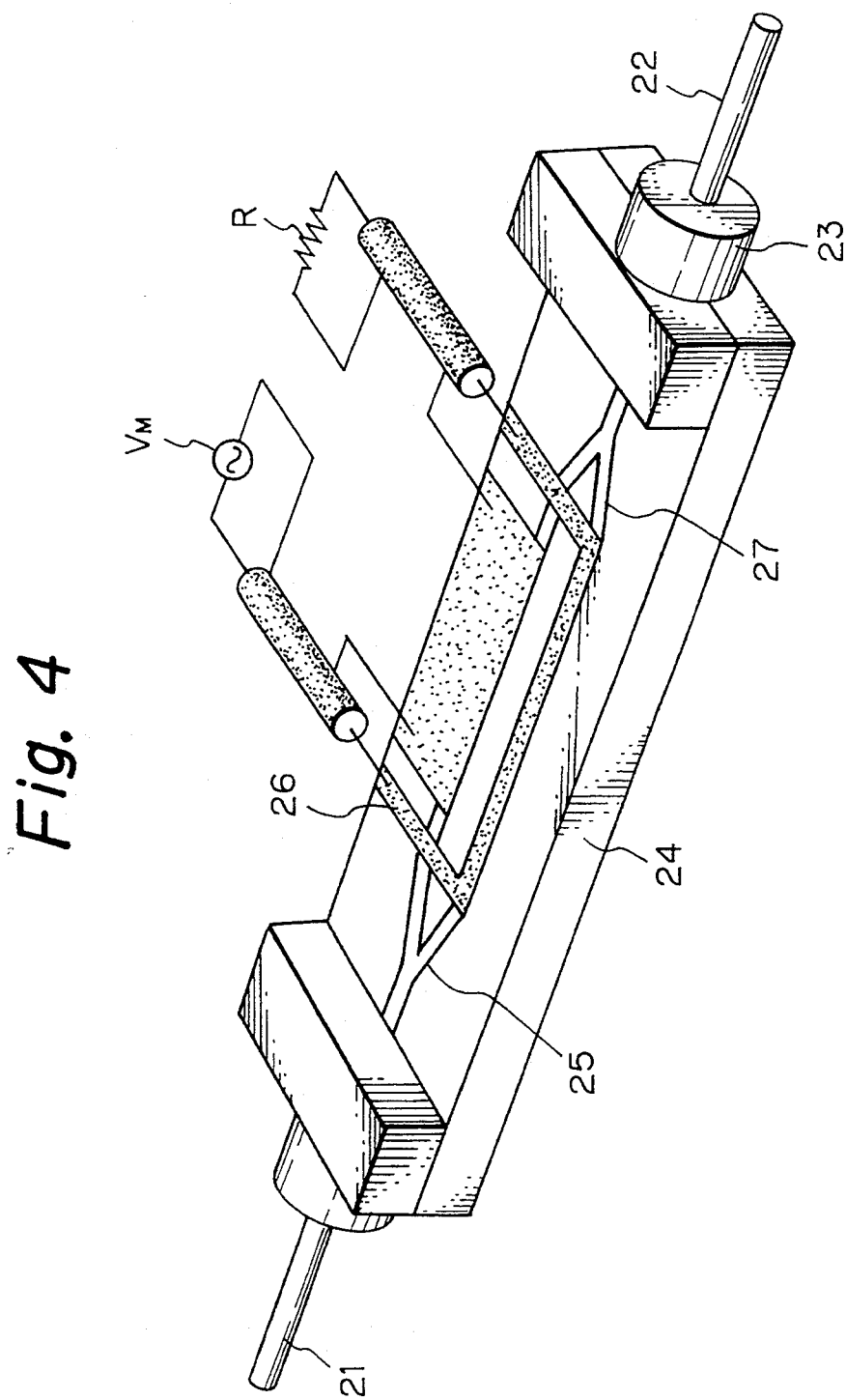

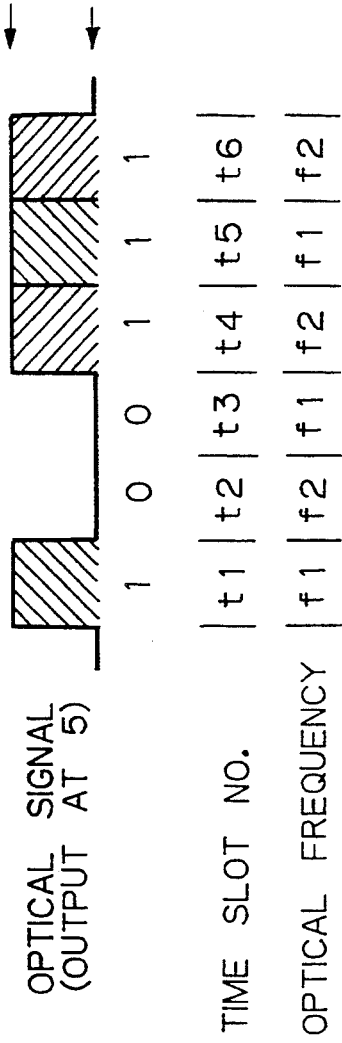
Fig. 5A ELECTRICAL SIGNAL S1 (INPUT AT 10)
Fig. 5B ELECTRICAL SIGNAL S2 (INPUT AT 10)
Fig. 5C ELECTRICAL SIGNAL S1 (OUTPUT AT 10)
Fig. 5D ELECTRICAL SIGNAL S2 (OUTPUT AT 10)
Fig. 5E OPTICAL SIGNAL (OUTPUT AT 5)

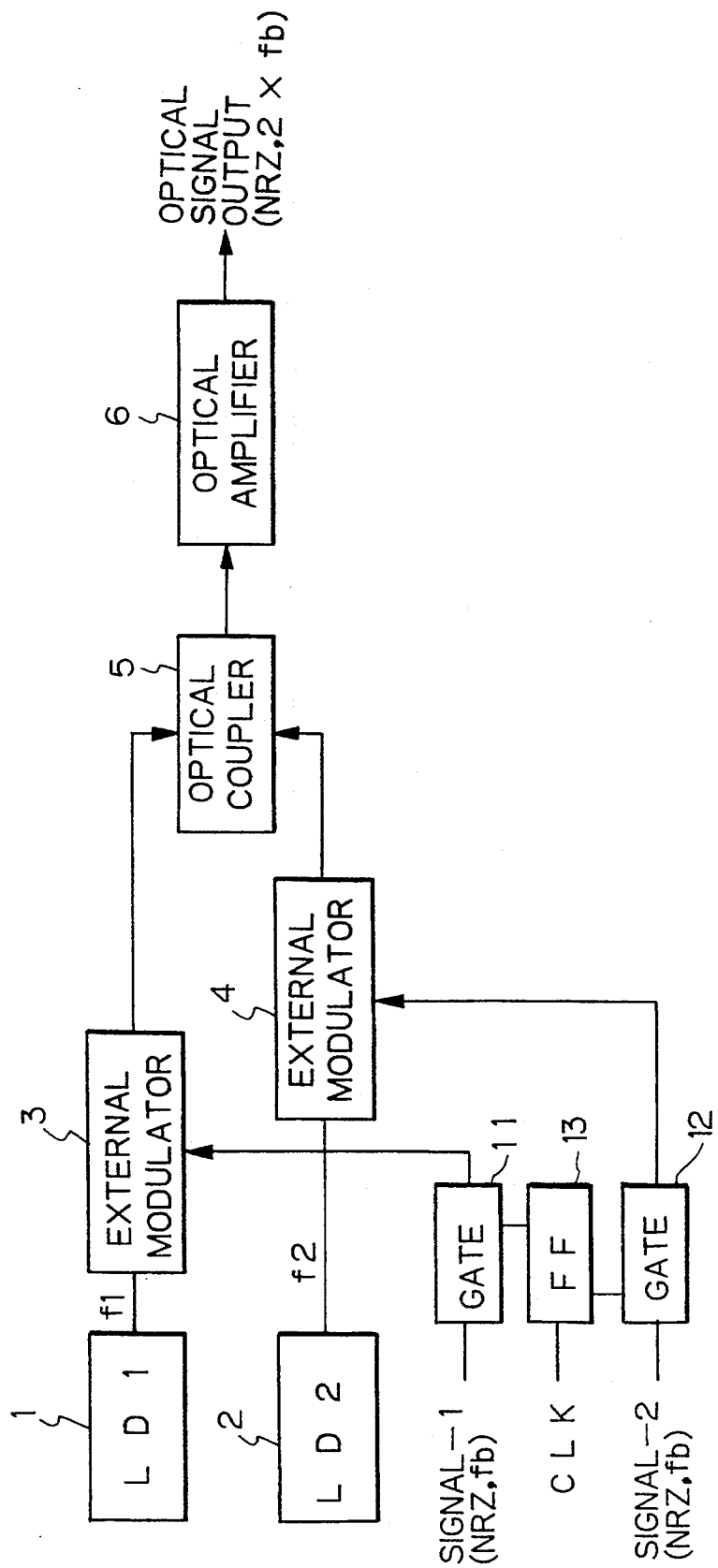

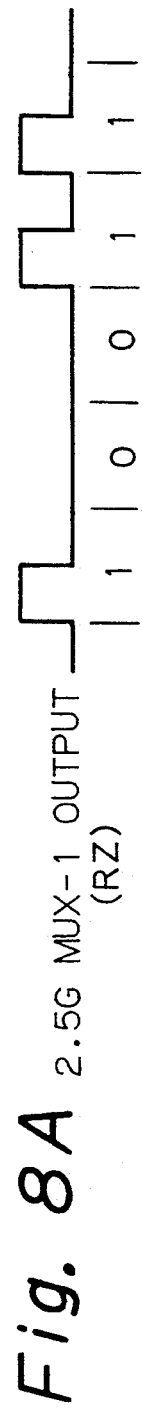
Fig. 8A  2.5G MUX-1 OUTPUT (RZ)
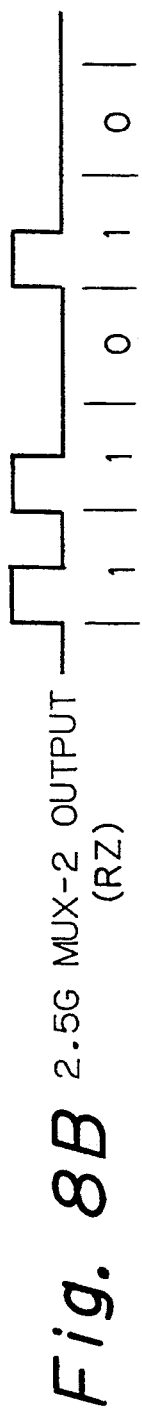
Fig. 8B  2.5G MUX-2 OUTPUT (RZ)
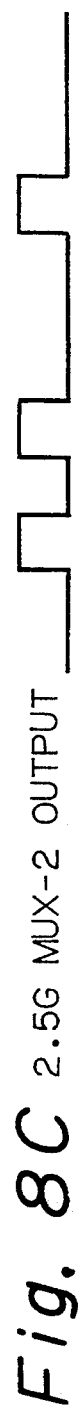
Fig. 8C  2.5G MUX-2 OUTPUT
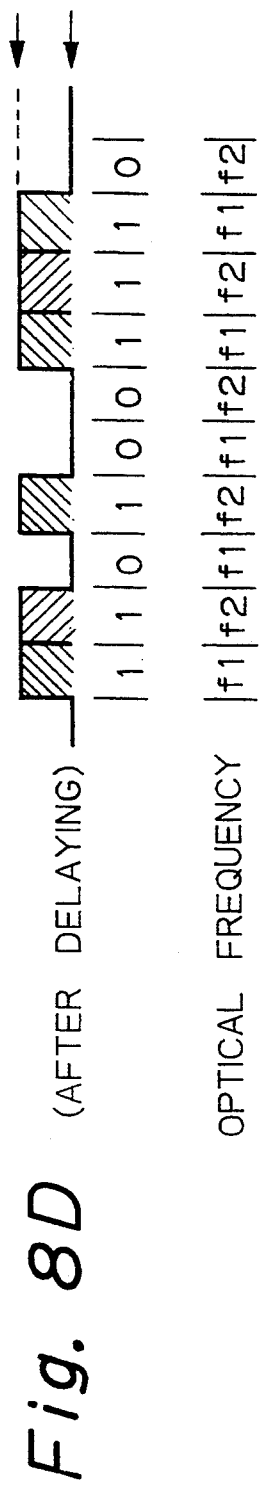
Fig. 8D  (AFTER DELAYING)
OPTICAL FREQUENCY

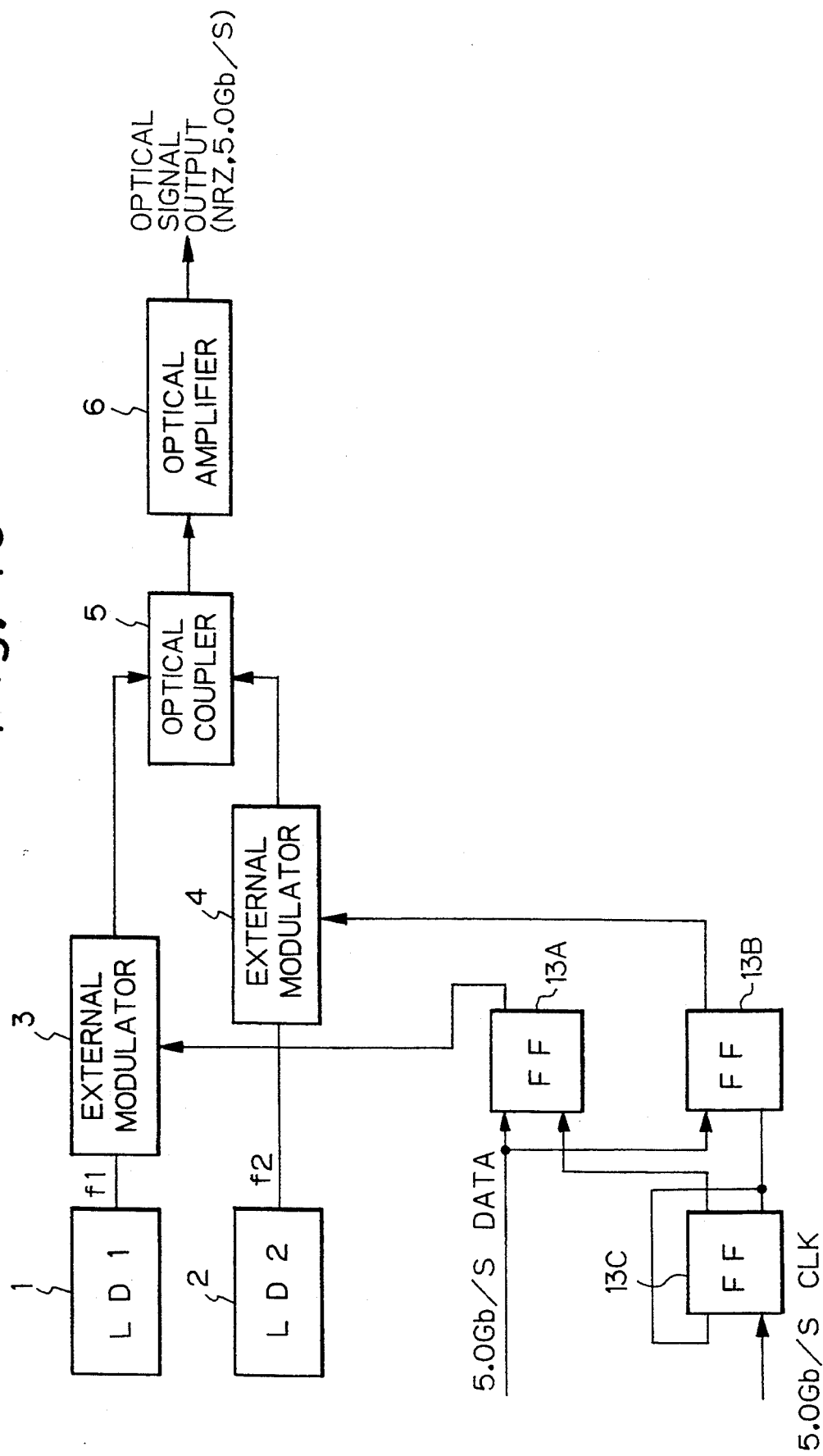

OPTICAL SIGNAL TRANSMISSION DEVICE

BACKGROUND OF THE INVENTION

1. Field of the Invention

The present invention relates to an optical signal transmission device, and more particularly to a device for suppressing stimulated Brillouin scattering to enable transmitting a higher than ever energy optical signal via an optical fiber device.

2. Description of The Related Art

In general, unification of spectra and enhancement of low loss performance of optical fibers have been advanced with the view of speeding up signal transmission and lengthening the distance between transit trunks. At present, high power transmission output by means of an optical fiber amplifier is desired in order to realize even greater distances.

In the prior art, in order to reduce influence on the transmission quality based on the dispersion of light in optical fiber, longer distances have been attempted by means of a unified mode of a laser diode as a light source, an increase in modulation rate based on the external modulation mode, increased power output of an optical transmitting output or the like. Nevertheless, based on the effect of stimulated Brillouin scattering generated by the optical fiber in a transmission line, a phenomenon that an error rate is increased, has occurred frequently.

Accordingly, even if the gain of an optical amplifier is increased, an optical transmission output cannot surpass a threshold value (for example, +9 dBm) in which the stimulated Brillouin scattering could occur, and a problem occurs which makes it impractical to utilize a high output provided by the optical amplifier.

SUMMARY OF THE INVENTION

An object of the present invention is to provide an optical signal transmission device which suppresses stimulated Brillouin scattering generated from the optical fiber in the transmission line to transmit a larger than ever optical signal via optical fiber.

In accordance with an aspect of the present invention, there is provided an optical signal transmission device comprising: a plurality of laser diodes having a different oscillating wavelength; a plurality of exclusive external modulators provided according to the number of the plurality of laser diodes for receiving corresponding outputs of the respective laser diodes, and for modulating output lights of the laser diodes by separate electrical signals; optical coupler means for coupling the optical signal outputs of the external modulators therewith; and optical amplifying means for amplifying the output of optical signals of the optical coupler means, wherein the modulated optical outputs of the external modulators are delivered to an optical fiber transmission line in a time-series-mode.

BRIEF DESCRIPTION OF THE DRAWINGS

FIG. 4 is a perspective view showing a lithium niobate (LiNbO$_3$) modulator.

FIGS. 5A, 5B, 5C, 5D and 5E are a timing chart of FIG. 3.

FIG. 6 is a view showing the configuration of a first embodiment in accordance with the present invention.

FIGS. 8A, 8B, 8C, and 8D are a timing chart showing the waveforms of FIG. 7.

FIG. 10 is a fourth embodiment of the present invention.

PREFERRED EMBODIMENTS OF THE INVENTION

An embodiment of the present invention will be described next with reference to a prior art drawings.

Figure 1:
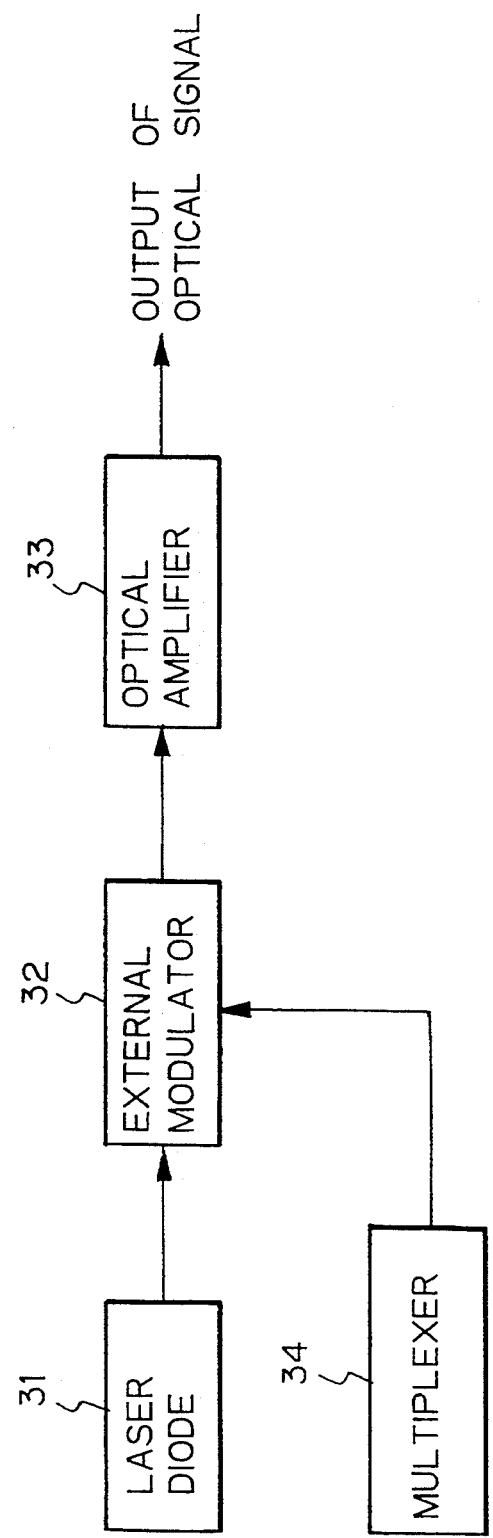
FIG. 1 denotes an example of a prior art transmitting device in a high speed optical signal transmission system.

FIG. 1 denotes an example of a prior art transmitting device in a high speed optical signal transmission system. In the figure, reference numeral 31 denotes a laser diode (L.D.) which generates a signal light, 32 an external modulator which modulates an output beam of laser diode 31 by an electrical signal, 33 an optical amplifier which amplifies a transmitted optical signal, and 34 a multiplexer which combines each electrical signal of a plurality of channels into a multiplexed electrical signal.

Figure 2:
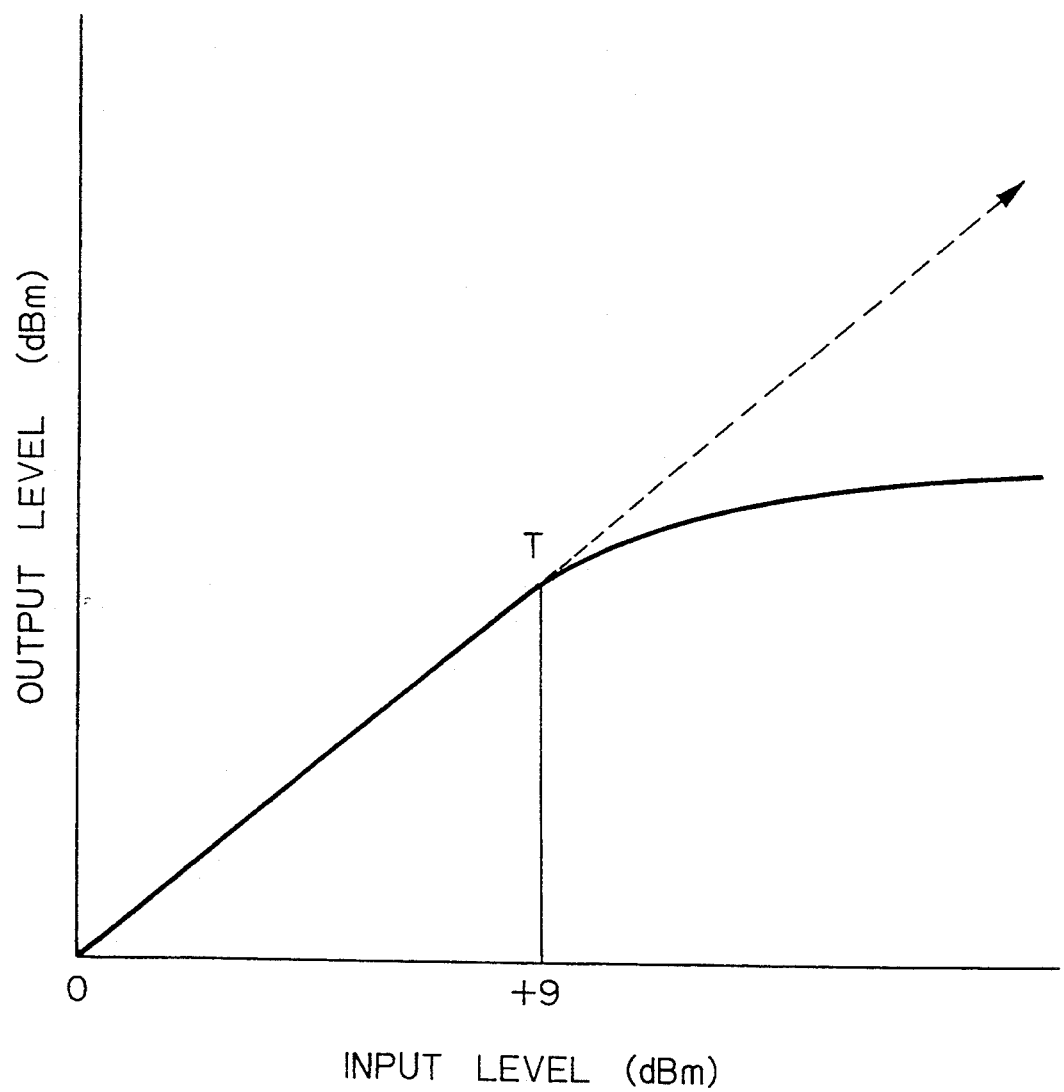
FIG. 2 illustrates an input versus output level characteristic.

FIG. 2 illustrates an input versus output level characteristic. At a portion between O and T, an input is proportional to an output, but when the input passes over a threshold point T of a value of 9 dBm, the relationship of input versus output becomes nonlinear and as shown in FIG. 2, it is not proportional. In other words, even if the input increases, the output does not increase, because the nonlinearity originates mainly from the stimulated Brillouin scattering phenomenon. Therefore, an optical transmission over a definite quantity cannot be realized and a width of a spectrum also cannot be made narrow.

Figure 3:
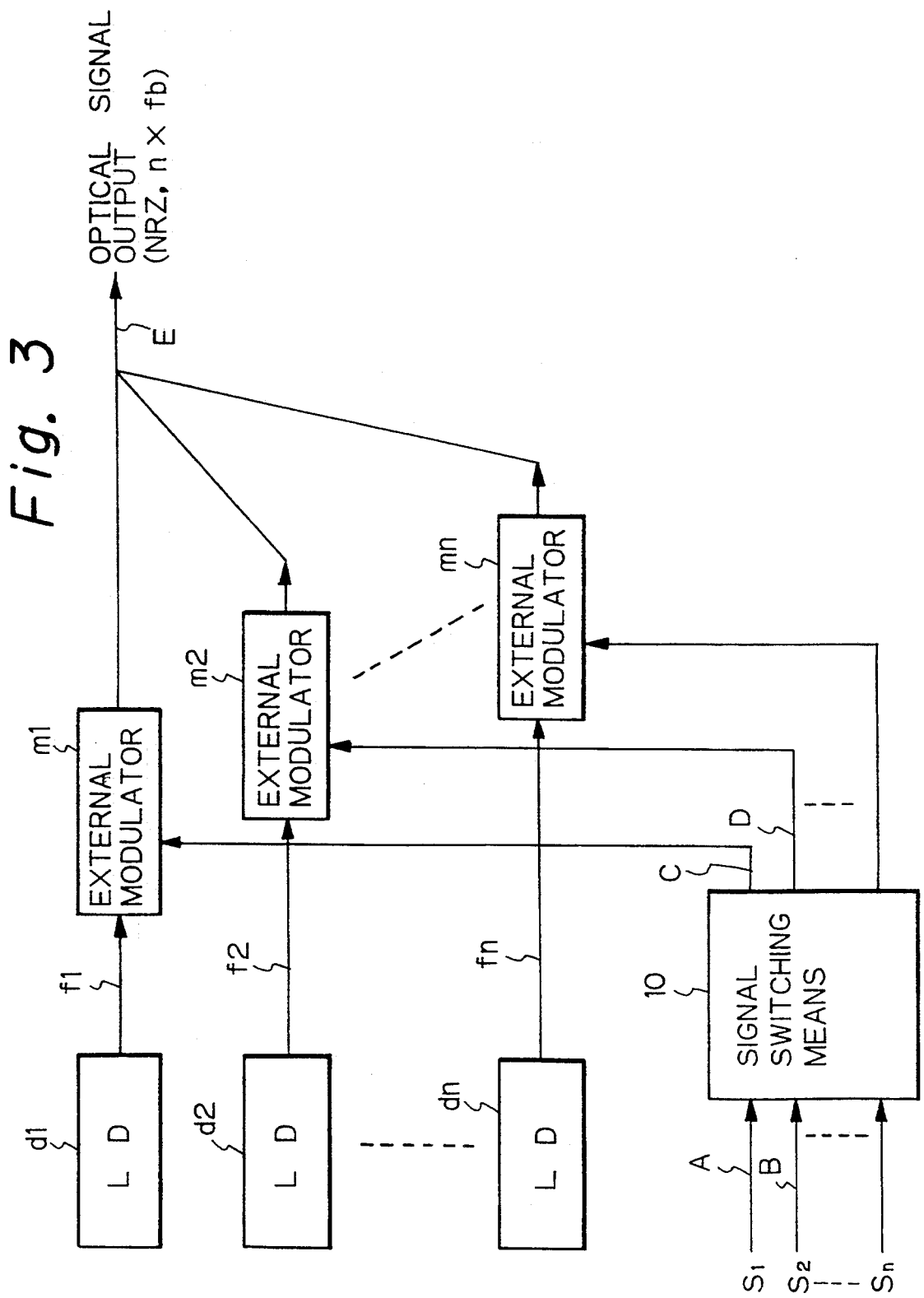
FIG. 3 is a view showing a basic feature of the present invention.

FIG. 3 is a view showing a basic feature of the present invention. The device of the present invention generally includes N (a natural number) of laser diodes. A description will only be given for a case where N=2, since other cases are easily understood therefrom.

In FIG. 3, d1 and d2 are laser diodes, which each produce signal light, m1 and m2 are external modulators, which modulate each signal light from laser diodes (d1 and d2) by electrical signals (S1 and S2), and reference numeral 10 denotes a signal switching means which delivers two electrical signals (S1 and S2) to each external modulator (m1 and m2) to which two signals are assigned in a time series form. In this case, the oscillation wavelength of each of the laser diodes (d1 and d2) is shifted by some quantity and a transmitting wavelength is switched in a time-series form within a half cycle of an electrical signal.

FIG. 4 is a perspective view showing a lithium niobate (LiNbO$_3$) modulator. In recent yearns, a high speed interferometric modulator has been developed which is fabricated on a Ti:LiNbO$_3$ substrate. This modulator reduces an insertion loss remarkably and exhibits no chirping in multi-G bit/s transmission line experiments.

In FIG. 4, reference numeral 21 denotes an input fiber or a polarization-maintaining fiber and 22 denotes an output fiber or a single-mode fiber, 23 a ruby bead, 24 a substrate having a Z-cut LiNbO$_3$ plate mounted thereon, 25 a mode coupling Y-branch, 26 a travelling wave electrode, 27 a waveguide, R a 50 Ω termination and $V_M$ a modulated voltage.

As described above, a complets Mach-Zehnder optical modulator obtains about 2 dB total insertion loss and a broadband response to 7 GHz was obtained with the travelling-wave electrode.

A low-loss Mach-Zehnder modulator is used for an external modulator, a continuous wave light input via a polarization-maintaining fiber is branched into two-system waveguides. If a voltage $V_M$ is applied to an electrode on the wave guide, the phase of each optical wave after passing through the wave guide is different. After the phase difference is made to be 180 degrees, a coupling is completed to lead to the appearance of no light by means of a push-pull operation of light waves. In other words, an incident light is intensity-modulated by a signal of the electrode to be output therefrom.

The function of the present invention will be described according to the explanatory view of the basic feature shown in FIG. 3. In the present invention, electrical signals S1 and S2 are NRZ (Non-Return-to-Zero) signals the bit rate of which is denoted by fb, as shown in FIG. 5.

Assuming that the input waveforms of each signal switching means 10 are A and B, respectively, the output waveforms of the signal switching means 10 are C and D, accordingly.

The output light of a laser diode d1 is modulated by the electrical signal S1 at the external modulator m1, in the case of odd time slots such as t1, t3, t5 and so on, whereas the output light of a laser diode d2 is modulated by the electrical signal S2 at the external modulator m2, in the case of even time slots such as t2, t4, t6 and so on.

Since both modulated light signals become the same waveform of optical signals as C and D, when both modulated light signals are coupled together as shown in FIG. 5, an NRZ light signal of a waveform E is obtained which has a bit rate two times (2×fb) that of the original electrical signals S1 and S2.

Since the multiplexed signals change the frequency of the modulated light signals every one bit, coherency between light signals in adjacent bits is weakened and the interference between the transmitted light and the returned light produced by the stimulated Brillouin scattering is weakened.

In other words, when the configuration of the present invention is adopted, the effect of suppressing the stimulated Brillouin scattering can be achieved, and therefore, transmission of a light signal at a high output level can be realized.

The embodiments of the present invention will be described next with reference to the figures.

FIG. 6A is a view showing the configuration of a first embodiment of the present invention.

In the figure, reference numerals 1 and 2 denote laser diodes which generate signal light beams having light frequencies f1 and f2; 3 and 4 external modulators in which each signal light of laser diodes LD1 and LD2 is modulated by electrical signals; 5 denotes a photocoupler which couples optical output signals modulated by external modulators 3 and 4; 6 an optical amplifier which amplifies the power of light signals; 11 and 12 denote gates which receive electrical signals to alternately input them to external modulators 3 and 4, respectively; and 13 denotes a flip-flop circuit which opens and closes each gate 11 and 12 alternately according to a clock signal (CLK) which has a bit rate two times (2×fb) that of the original electrical signals.

As shown in the prior FIG. 5, according to the configuration of FIG. 6A, an optical signal of frequency f2 is delivered in certain time slots (t1, t3, t5 and so on), whereas an optical signal of frequency f1 is delivered in other time slots (t2, t4, t6 and so on). The optical frequency (f1, f2) is switched alternately and coherency is deteriorated in practice and the influence of returned light is reduced. As a result, it is advantageous that after an optical signal is amplified by an optical amplifier 6, an output of the amplified optical signal can be delivered to an optical transmission line at a high output level by an NRZ data transmission method with a (2×fb) bit rate. Further, since the optical frequencies f1 and f2 have a spectrum close to each other, it is not necessary to use any special means for receiving light at the receiving side and a conventional monochromatic light receiving circuit may be employed.

Figure 7:
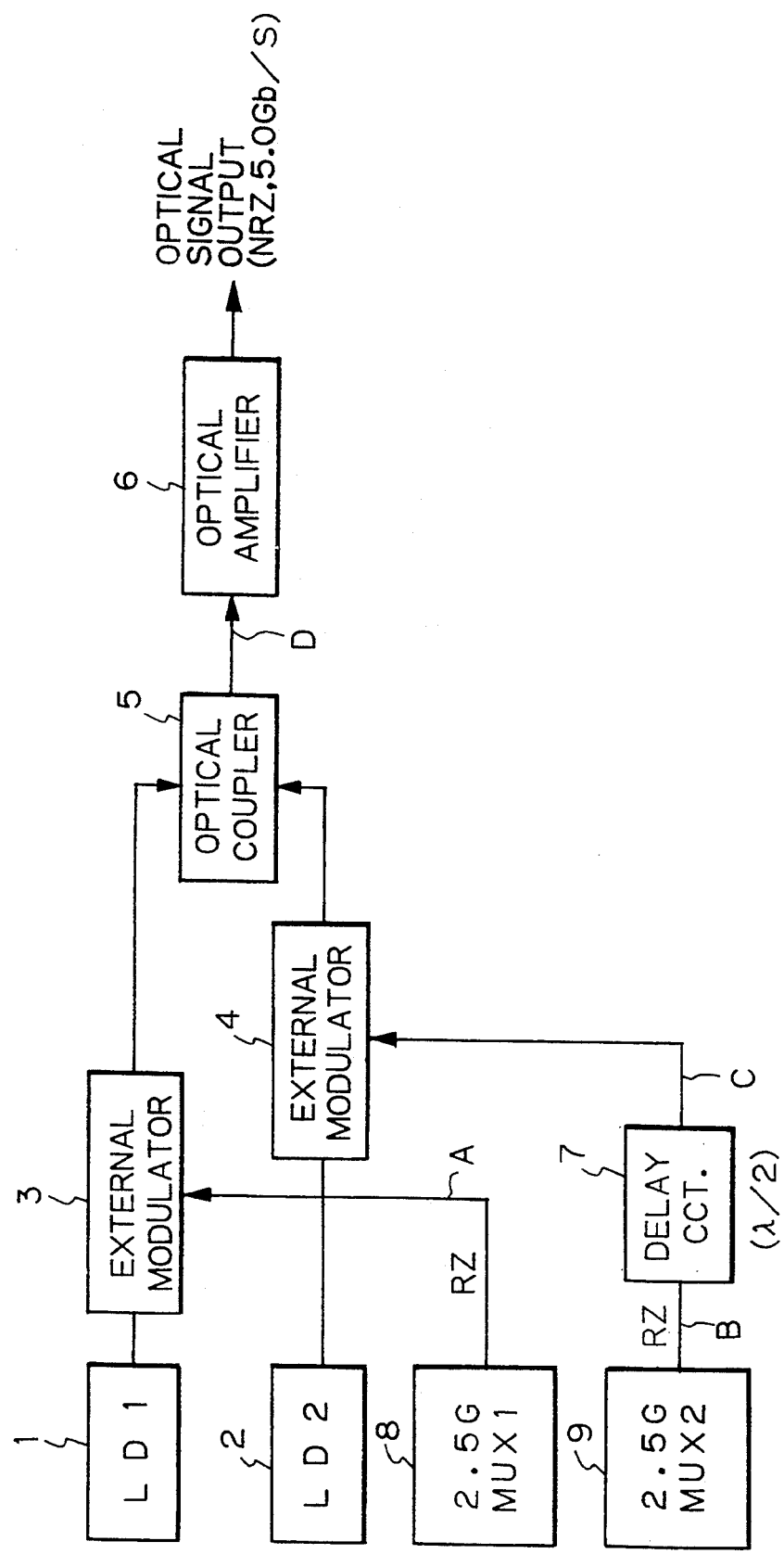
FIG. 7 is a view showing a second embodiment in accordance with the present invention in a 5.0 Gb/s system.

FIG. 7 is a view showing a second embodiment in accordance with the present invention.

In FIG. 7, reference numerals 1 and 2 denote laser diodes; 3 and 4 external modulators; 5 denotes a photocoupler; 6 an optical amplifier which functions in the same way as in FIG. 6A; 7 a delay circuit which delays an electrical signal for a definite time; 8 and 9 denote multiplexers (abbreviated MUX), which transform a plurality of channels of signals into a time-division multiplexed signal; A, B and C denote each output electrical signal of multiplexer 8 (MUX1), multiplexer 9 (MUX2) and a delay circuit 7, respectively; and D denotes an output optical signal of photocoupler 5.

With reference to FIGS. 8A-8D, a process of signal multiplexing will be described for an example of a 5.0 Gb/s system.

The multiplexer is assumed to be a device conforming to a synchronous digital hierarchy (SDH), and since the output of a multiplexer 1 (MUX1) is synchronized with that of a multiplexer 2 (MUX2), the present invention can be easily applied thereto. In FIG. 7, when an output A of multiplexer (8) MUX1 is input to an external modulator 3, an optical signal of a return-to-zero (RZ) code which is the same as the output A is obtained at the output of the external modulator 3. When an output B of the multiplexer (9) MUX2 is input to a delay circuit 7, a signal C which is delayed only by half a cycle of the RZ signal is obtained at the output of the delay circuit 7. When the signal C is input to the external modulator 4, the RZ signal which is the same as in the above signal C is obtained at the output of the external modulator 4. The respective output optical signals of the external modulators 3 and 4 are synthesized at an optical coupler 5 to obtain an NRZ signal D. The signal D can be changed over between two optical frequencies f1 and f2 when the optical frequency (wavelength) is a speed of 5.0 Gb/s, coherency is weakened in a practical use to reduce the influence of returned light, the same as shown in FIG. 6A.

Since an RZ code signal is utilized in this embodiment of the present invention, only if either of the signals is delayed in the delay circuit 7, it is not necessary to provide the signal switching means 10 in FIG. 3 which includes gates 11 and 12, and a flip-flop circuit 13 as shown in FIG. 6A. The concrete configuration of the delay circuit 7 can easily be realized by making the length of a coaxial line from the multiplexer 2 to the external modulator 4 longer by four centimeters than the length of a coaxial line from the multiplexer 1 to the external modulator 3.

As for the receiving side, it is not necessary to use a special means in the same way as in FIG. 6A, since if a conventional monochromatic light receiving circuit is employed, an NRZ code signal of 5.0 Gb/s is obtained.

Figure 9:
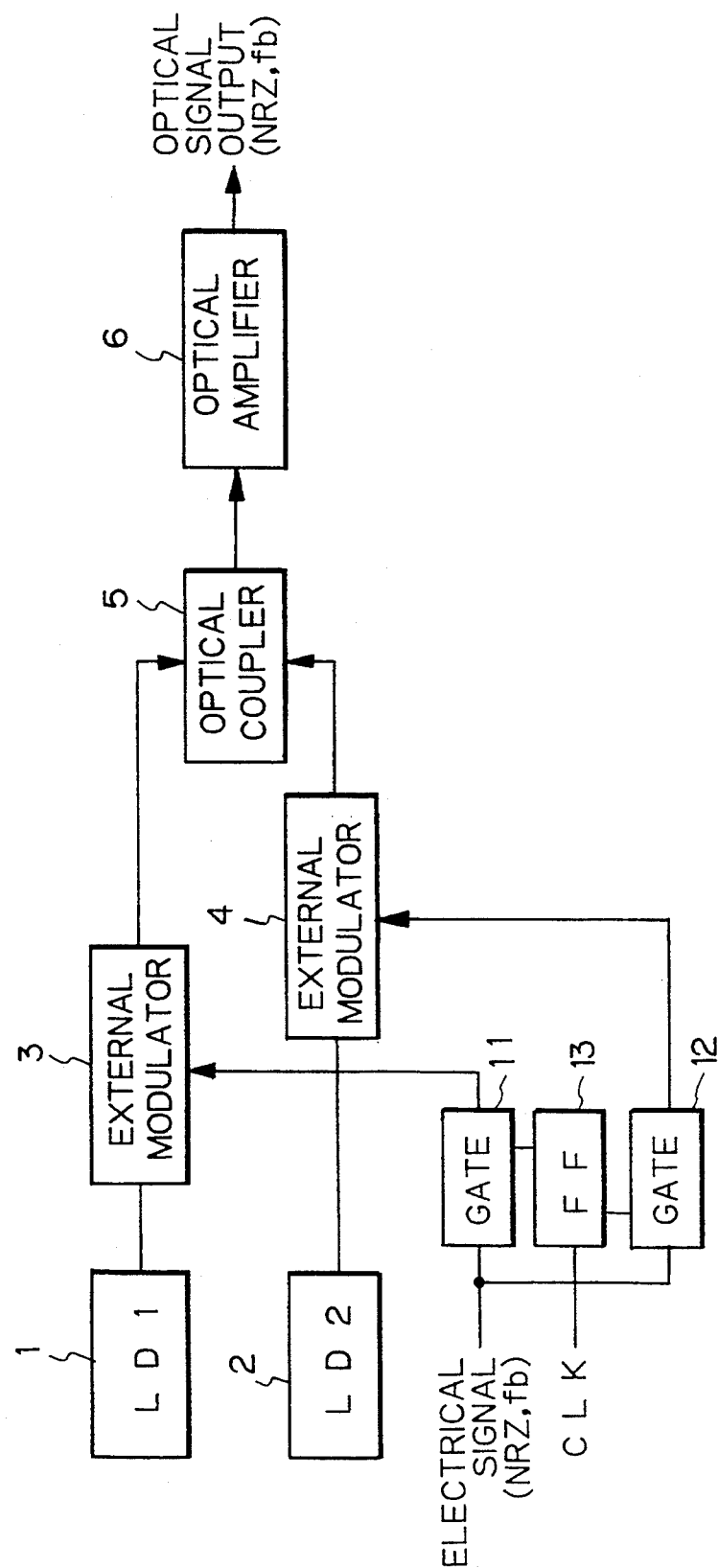
FIG. 9 is a third embodiment of the present invention.

FIG. 9A is a view showing a third embodiment, in which an electrical signal is not multiplexed and the same signals are input to each gate. Other points are the same as in FIG. 6A. The term "being not multiplexed" means that both laser diodes LD1 and LD2 are not modulated by separate electrical signals, but in a case where an electrical signal has already been modulated, it is also applicable.

FIG. 10A is a view showing a fourth embodiment of the present invention. FIG. 10A shows a second example where an electrical signal is not multiplexed. A 5.0 Gb/s clock signal is input to a first flip-flop 21 and outputs thereof are input to a second and third flip-flops 22 and 23. On the other hand, a 5.0 Gb/s data signal is input to a second and third flip-flops 22 and 23 and via a serial-parallel converter two electrical signals of 2.5 Gb/s are delivered to respective external modulators 3 and 4 to modulate respective output optical signals of laser diodes 1 and 2. The outputs of each laser diode are coupled at an optical coupler 5 and amplified at an optical amplifier 6 to output an optical signal of 5.0 Gb/s in an NRZ mode, the same as in FIG. 6A.

As described above, in accordance with the present invention, a stimulated Brillouin scattering is suppressed and an increase in an output level of an optical amplifier can be realized and a realization of a longer distance repeating line in an optical fiber transmission system can be improved.

I claim:

1. An optical signal transmission device comprising:
   a plurality of laser diodes having different oscillating wavelengths;
   a plurality of exclusive external modulators provided according to the number of said plurality of laser diodes for receiving corresponding outputs of said respective laser diodes, and for modulating output lights of said laser diodes by separate electrical signals;
   optical coupler means for coupling the modulated output lights from said plurality of external modulators together; and
   optical amplifying means for amplifying the output level of the modulated optical lights coupled by said optical coupler means,
   wherein the modulated optical outputs of said external modulators are delivered to an optical fiber transmission line in a time-series-mode;
   said separate electrical signals for modulating the external modulators are switched and delivered by a signal switching means receiving a plurality of electrical signals; and said signal switching means includes a flip-flop for inputting an electrical clock signal and at least two gates for inputting electrical signals each having a bit rate fb and being in an NRZ (Non-return-to-zero) mode, and said optical amplifier outputs a dual-multiplexed optical signal.

2. An optical signal transmission device comprising:
   a plurality of laser diodes having different oscillating wavelengths;
   a plurality of exclusive external modulators provided according to the number of said plurality of laser diodes for receiving corresponding outputs of said respective laser diodes, and for modulating output lights of said laser diodes by separate electrical signals;
   optical coupler means for coupling the modulated output lights from said plurality of external modulators together; and
   optical amplifying means for amplifying the output level of the modulated optical lights coupled by said optical coupler means,
   wherein the modulated optical outputs of said external modulators are delivered to an optical fiber transmission line in a time-series-mode;
   said separate electrical signals for modulating the external modulators are switched and delivered by a signal switching means receiving a plurality of electrical signals; and said switching means includes two multiplexers and a delay circuit, said multiplexers output RZ signals having the same bit rate and a second electrical signal is delayed by a half period from a first electrical signal, and said optical amplifier outputs optical signals of twice the bit rate (2×fb) in an NRZ mode.

3. An optical signal transmission device comprising:
   a plurality of laser diodes having different oscillating wavelengths;
   a plurality of exclusive external modulators provided according to the number of said plurality of laser diodes for receiving corresponding outputs of said respective laser diodes, and for modulating output lights of said laser diodes by separate electrical signals;
   optical coupler means for coupling the modulated output lights from said plurality of external modulators together; and
   optical amplifying means for amplifying the output level of the modulated optical lights coupled by said optical coupler means,
   wherein the modulated optical outputs of said external modulators are delivered to an optical fiber transmission line in a time-series-mode;
   said separate electrical signals for modulating the external modulators are switched and delivered by a signal switching means receiving a plurality of electrical signals; and said switching means includes a first flip-flop for inputting a clock and second and third flip-flops for inputting data simultaneously, and when a 2N Gb/s clock signal is input to said first flip-flop, two NGb/s data signals are obtained from the outputs of said second and third flip-flops by means of a series/parallel conversion, to modulate the outputs of each laser diode.

* * * * *